United States Patent [19]

Floyd et al.

[11] 4,060,507

[45] Nov. 29, 1977

[54] AMINOPOLYAMIDE-ACRYLAMIDE-GLYOXAL RESIN

[75] Inventors: Don E. Floyd; Demetri Potente, both of Minneapolis, Minn.

[73] Assignee: General Mills Chemicals, Inc., Minneapolis, Minn.

[21] Appl. No.: 601,143

[22] Filed: Aug. 1, 1975

[51] Int. Cl.² ............... C08G 12/04; C08L 61/20; D21D 3/00; D21H 3/52
[52] U.S. Cl. ...................... 260/21; 162/166; 162/167; 162/168 NA; 260/18 N; 260/29.4 R; 260/72 R; 260/72 N
[58] Field of Search ............ 260/21, 72 N, 72 R, 260/18 N, 29.4 R; 162/166, 167, 168 NA

[56] References Cited

U.S. PATENT DOCUMENTS

| | | | |
|---|---|---|---|
| 3,127,365 | 3/1964 | Floyd | 260/18 N |
| 3,607,622 | 9/1971 | Espy | 162/167 |
| 3,728,214 | 3/1973 | Espy | 162/167 |
| 3,728,215 | 4/1973 | Espy | 162/167 |

*Primary Examiner*—Ronald W. Griffin
*Attorney, Agent, or Firm*—Patrick J. Span; Gene O. Enockson

[57] ABSTRACT

Disclosed are novel aminopolyamide-acrylamide-glyoxal resins useful as a sizing agent for paper having low water absorption, a desirable property for sized paper. The products are water dispersible and/or soluble and also find utility in printing inks, textile treatment and cosmetic or beauty aid compositions. The aminopolyamide is the condensation product of a polymeric fat acid and polyalkylene polyamine.

8 Claims, No Drawings

AMINOPOLYAMIDE-ACRYLAMIDE-GLYOXAL RESIN

This invention relates to a resinous sizing agent for paper which is an aminopolyamide-acrylamide-glyoxal resin. The product is advantageous in having low water absorption, a desirable property for sized paper. The products are water dispersible and/or soluble and also find utility in printing inks, textile treatment and cosmetic or beauty aid compositions. The products are well-suited for these uses because they require no flammable or toxic solvents. Certain water miscible solvents, such as ethanol or propanol may be added where solvents are desirable. The aminopolyamide is the condensation product of a polymeric fat acid and a polyalkylene polyamine.

BACKGROUND OF THE INVENTION

In U.S. Pat. No. 3,127,365 there are disclosed modified aminopolyamides which were useful as casting and potting resins and for sizing glass fibers. These were aminopolyamides of a polymeric fat acid and a polyalkylene polyamine modified by reaction with an active acrylic compound including an acrylamide.

In U.S. Pat. No. 3,728,215, there is disclosed the reaction product of an aminopolyamide, an acrylamide and a polyaldehyde wherein the amino polyamide is the condensation product of a polyamine with an alpha,-beta-unsaturated monobasic carboyxlic acid, such as acrylic acid. The product is useful as a wet strength resin for paper.

SUMMARY OF THE INVENTION

It has now been found that an acrylamide adduct of an aminopolyamide of a polymeric fat acid when further reacted or modified with glyoxal provides a product having low water absorption suitable for use as a resinous sizing agent for paper. The product is prepared by reacting the aminopolyamide with an unsaturated amide and subsequently reacting the aminopolyamide-unsaturated amide adduct with glyoxal. Other aldehydes do not appear to function in the same manner as glyoxal.

The aminopolyamide is one in which an excess of polyamine is reacted with the polymeric fat acid to form a polyamide having unreacted or free amino groups. The acrylamide compound is employed in an amount sufficient to react with substantially all the amine groups of the polyamide, generally in slight excess. The glyoxal is employed in an amount of about 0.3 to 1.5 moles glyoxal per amide group present.

Sized paper is prepared by immersion in a dilute solution of the sizing agent in the water or by casting the surface of the paper followed by drying. It may also be incorporated in the paper during manufacture by addition to the paper pulp slurry before the paper sheet is formed.

DETAILED DESCRIPTION AND PREFERRED EMBODIMENTS

As earlier indicated, the resinous sizing agents of this invention are prepared by reacting an aminopolyamide of a polymeric fat acid with an acrylamide with further reaction with glyoxal. The polymeric fat acid aminopolyamide resins to be reacted with an acrylamide are well known as disclosed in U.S. Pat. No. 3,127,365, the description of which is hereby incorporated by reference.

Briefly (as described in U.S. Pat. No. 3,127,365), the amino-polyamide resins useful in the above compositions are those in which an excess of a polyamine is reacted with polymeric fat acids to form a polyamide having unreacted amino groups. The amount to these unreacted amino groups can be measured by determining the amine number, the amine number being the number of milligrams of KOH equivalent to the free amine groups in a one gram sample of the resin. Generally speaking, the amino-polyamide resins employed in this invention should have an amine number in the range of about 150 to 600 with a preferred range of from 225 to 400. It will be seen that in order to obtain an amino-polyamide resin of the type employed in this invention, having unreacted amino radicals, it is necessary to employ polyamines that are at least trifunctional amines since for the most part, at least two amine groups in each molecule will be tied up in the amide linkages. When one of the two amine groups that react to form the amide is a secondary amine, at least one of the terminal primary amines will be free in the form of a branched chain in contrast to a linear amino-polyamide resulting from the reaction of both primary amine groups to form the amide linkages. Under normal conditions, the polybasic amine will react with the polymeric fat acids to form a random mixture of branched and linear type linkages.

The polyamines employed to react with the polymeric fat acids in the preparation of the amino-polyamide resins have the general formula $$H_2NR(NHR)_pNH_2$$

where R is an alkylene radical having about 2 to 6 carbon atoms and p is a positive integer less than 6. Illustrative polyamines are diethylenetriamine, triethylenetetramine, tetraethylenepentamine, di-1,3-propanetriamine, tri-1,3-propanetriamine, di-1,2-propanetriamine and the like. Thus, the alkylene radical in the above formula is generally ethylene but should not be limited thereto.

The polymeric fat acids employed in preparing the amino-polyamide resins are those resulting from the polymerization of drying or semi-drying oils, or their free acids or the simple aliphatic alcohol ester of these acids. Suitable drying or semi-drying oils include soybean, linseed, tung, perilla, cottonseed, corn, sun flower, safflower and dehydrated castor oils. Suitable fatty acids may also be obtained from tall oil, soapstock, and other similar material. In the polymerization process for the preparation of the polymeric fat acids the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. Thus, the term "polymeric fat acids" as used herein is intended to include the polymerized mixture of acids, which usually contain a predominant portion of dimer acids, a small quantity of trimer and higher polymeric fat acids and some residual monomer.

Polymeric fat acids are commercially available products. A description of these acids and their method of preparation may be found in U.S. Pat. No 3,201,471. As indicated in this patent, polymeric fat acids result from the polymerization of saturated, ethylenically unsaturated or acetylenically unsaturated naturally occurring or synthetic monocarboxylic aliphatic acids containing from 8 to 24 carbon atoms. The preferred monocarboxylic acids from which polymeric fat acids are prepared are those containing about 16 to 20 carbon atoms and commercially the 18 carbon atom monocarboxylic acids such as oleic, linoleic, linolenic, and eleostearic acids are employed as starting materials for the preparation of the polymeric fat acids. A mixture of acids, tall oil fatty acids, (predominately a mixture of oleic and linoleic acids) is the most common starting material.

After polymerization, with or without a catalyst, the resulting product is a mixture of predominantly dimeric fat acids, some trimeric and higher polymeric fat acids and some unpolymerized monomeric fat acids. Typical commercially available polymeric fat acids based on $C_{18}$ unsaturated acids, i. e. tall oil fatty acids, will have a dimeric fat acid content of about 60 to 80% by weight, a trimeric and higher polymeric fat acid content of about 10 to 35%, and a monomeric fat acid content of about 5 to 20% by weight. For the purposes of this invention, it is preferable that the dimeric fat acid content not exceed 85% by weight, the monomeric fat acid content not exceed 20% by weight and the trimeric fat acid content not exceed 35% by weight. However, in the interest of lower costs it has been found that a monomeric fat acid content of over 50% can be used although sizing capability of the product is somewhat reduced. Such a high monomeric fat acid content is obtained by adding monomeric fat acids, such as tall oil fatty acids, to the polymeric fat acids.

Reference has been made above to the monomeric, dimeric and trimeric fat acids present in the polymeric fat acids. The amounts of monomeric fat acids, often referred to as monomer (M), dimeric fat acids, often referred to a dimer (D), and trimeric or higher polymeric forms, often referred to as trimer (T), may be determined by gas liquid chromatography (GLC) of the methyl esters of the polymeric fat acids. In this method of analysis, an intermediate (I) is seen between the monomer and dimer forms. It is desirable that this intermediate be low, but polymeric fat acids generally having less than 10%, and preferably less than 6% intermediate by weight are satisfactory. Unless otherwise indicated, this analytical method was employed in the analysis of the polymeric fat acids employed in this invention.

The polymeric fat acids may be fractionated to provide products having higher dimer contents, by conventional distillation, or solvent extraction techniques may be employed therefor. They may also be hydrogenated (before or after distillation) to reduce unsaturation, under hydrogen pressure in the presence of a hydrogenation catalyst, as illustrated in U.S. Pat. No 3,256,304. It is also understood that such other derivatives of polymeric fat acids which are capable of forming amides in reaction with a diamine, such as the lower alcohol (1 to 8 carbon atoms) esters of polymeric fat acids may be employed in place of the acids themselves in which the by-product is then a lower alcohol rather than water.

In general, the polymeric fat acid aminopolyamide resins are preferably prepared by reaction in the temperature range of about 100 to 300° C. accompanied by removal of any byproduct water. The reaction is preferably carried out at about 250° C. The time of reaction may also be varied widely and will depend somewhat on temperature. Normally, a time period of 3 to 8 hours after reaching the selected temperature is required. The preferred time of reaction is about 5 hours. A typical set of reaction conditions is 250° C. for a period of 5 hours. Vacuum may be applied, if desired, to withdraw volatile by-products and to keep the resin mixture from contact with air which may cause darkening. An inert gas may also be employed to avoid contact with air.

As stated above, in the preparation of the resins of this invention the aminopolyamide is reacted with an acrylamide, including substituted acrylamides, such as methacrylamide, -ethylacrylamide, and crotonamide which (following the active acrylic compound formula of U.S. Pat. No. 3,127,365 wherein A is

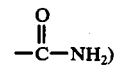

may be represented by this structural formula

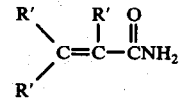

where R' is a hydrogen or alkyl group containing up to 6 carbon atoms, more desirably not more than 3. Preferably, R' will be either hydrogen or methyl. The aminopolyamide is thus modified by Michael addition to increase the amide content. In the reaction a sufficient amount of the acrylamide will be used to react with substantially all of the amine groups in the aminopolyamide. Thus, generally one equivalent or more of acrylamide per equivalent of amino groups in the aminopolyamide is employed. In practice, an excess of acrylamide may help to drive the carbamidoethylation of the amines to a substantial completion in a reasonable time. The reaction between the aminopolyamide and acrylamide can be carried out at any temperature between about 20° C. and the boiling point of the reaction mixture at the solids concentration used. Temperatures between about 60° C. and about 110° C. are most preferred. A high pH during the reaction is favored since this frees the amine groups from their salts. Ordinarily the natural pH of the aminopolyamide solution is satisfactory but it may be adjusted, if necessary.

Although by careful handling, the reactants may be reacted in the absence of a solvent, it is generally preferable to carry out the reaction in the form of an aqueous solution or dispersion. Either water alone is used or solvents may be used such as ethanol, isopropanol, n-propanol, butanol, other alcohols or mixtures of alcohols. When water alone is used, the concentration of the aqueous dispersion employed is on the order of about 10 to 30%, and preferably about 20% by weight of nonvolatiles (aminopolyamide or acrylamide).

The final reaction in the preparation of the wet strength resins of this invention is between the aminopolyamide-acrylamide adduct and glyoxal. Other polyaldehydes, while they may react with the adduct, do not appear to provide products possessing the desirable properties obtained when glyoxal is employed. The glyoxal, available commercially as an aqueous solution, is next added to the aqueous dispersion obtained in forming the acrylamide adduct at a ratio of about 0.3 to 1.5 moles glyoxal per amide group present. Since the final products are more stable at low pH values than at high pH values, it is preferred that the pH be adjusted to the range of 3 to 5 through addition of an acid, either a mineral acid or a short chain organic acid (up to about 3 carbon atoms) such as the aliphatic monocarboxylic acids like formic, acetic or propionic acid. A strong, volatile acid such as hydrochloric or formic is preferred. Generally, sulfuric acid should not be used because of its relatively low volatility and because it may cause precipitation of a solid compound.

When using the resins of this invention in papermaking, they can be added at any time before, during or after the paper is formed. For example, the resin can be added before or after the refining of the pulp, at the fan pump or head box, or by spraying on the wet web. The resin can also be added to preformed paper by tub sizing or spraying on the dried paper sheets. In most commercial papermaking, it will be preferred to add the resin at the fan pump or head box in the form of an aqueous solution of up to 15 percent solids. Various amounts of the resin can be used. The amount of resin added should be sufficient to result in a paper containing from about 0.03 percent to about 5 percent by weight based on the weight of the paper. The actual amount of any specific purpose can be easily determined by one skilled in the art. As stated above, no heat curing is required with the resins of the instant invention since they develop their optimum strength on normal drying. They can be added to paper over a wide range of pH values. However, best results are obtained by adding the resin to the paper at a pH of from about 1 to about 8, most preferably from about 3 to about 6.

Other ingredients can be used in conjunction with the resins of this invention. The additives or ingredients commonly used in papermaking can be used here also as for example alum, rosin size, coating colors, mineral fillers, starch, casein etc. The presence of other ingredients is not essential to this invention and excellent results are achieved when using only the resins of this invention.

It will be obvious to those skilled in the art that the resins of this invention can be incorporated into various types of paper such as kraft paper, sulfite paper, semi-chemical paper, etc. both bleached and unbleached.

The following examples will serve to illustrate the invention, parts and percentages being by weight unless otherwise indicated. In all the examples, the aminopolyamide used was prepared from polymerized tall oil fatty acids having the typical analysis noted earlier. Sizing properties can be tested in a number of ways. In the following examples, a modification of the Cobb size test was employed. In our procedure, a sheet of blotting paper is immersed briefly in a dilute solution of the sizing agent in water, the paper is dried, then conditioned at approximately 75° F. and 50% relative humidity before testing. A 5 inch by 5 inch square weighing about 4 g is cut, pre-weighed, and clamped in the Cobb test device, a metal cylinder on a rubber pad with cross-sectional area of 100 sq. cm and depth of 2.7 cm. Next, 75 ml of water is poured into the cylinder and held for a prescribed length of time (about 40 seconds). The water is poured off and the sheet removed and quickly mopped free of excess water during the next 20 seconds. It is then re-weighed. The weight increase multiplied by 100 is reported as the moisture absorption in grams per square meter for a one minute Cobb test. A low value is desired for sized paper.

EXAMPLE I

A dispersion of 10 g of a polymeric fat acid aminopolyamide in water at 20 percent non volatile (NV) was prepared and to it was added a 20 percent solution of 7.1 g of acrylamide in water. The aminopolyamide was prepared from an excess of a mixture of triethylene tetramine and tetraethylene pentamine providing a product having an amine number of about 350. The mixture was stirred and heated at 85° to 90° C. for 2 hours. It became translucent and viscous. The pH of the mixture was reduced from about 8.6 to approximately 7.5 by adding 3 molar hydrochloric acid, dropwise, with stirring. The temperature was lowered to 50° C. and 11 g of 40 percent aqueous glyoxal and 11 g of water was added. It was held at 50±5° C. for one-half hour. Then the pH was lowered further (to approximately 5) with more hydrochloric acid and it was diluted to 10 percent NV with water. A pale amber, clear liquid was obtained.

A 0.1 percent NV solution of the product gave a value of 22.3 g/sq. meter in the size test while a blank sheet was found to become completely soaked in a few seconds to a value well over 200.

EXAMPLE II

The procedure of Example I was followed with the same aminopolyamide resin thereof, running the reaction at 20 percent NV in water using:
 15 g Aminopolyamide
 7 g Acrylamide (approximately one eq. acrylamide per eq. amino group)
 16 g 40% glyoxal solution (approximately one mole glyoxal per amide group)

The pH was lowered to approximately 5 with hydrochloric acid and the product diluted with water to 10 percent NV. An amber, clear liquid was obtained. The sizing test result was 25.5 g/sq. meter.

EXAMPLE III

The procedure and aminopolyamide of Example II was followed but with:
 15 g Aminopolyamide
 9 g Acrylamide
 16 g 40% glyoxal solution
The sizing test result for product was 28.4 g/sq. meter.

EXAMPLE IV

In order to illustrate the effect of an insufficient amount of acrylamide less than 1 eq. of acrylamide per eq. of amine, the procedure and aminopolyamide of Example II was followed but with:
 15 g Aminopolyamide
 4.9 g Acrylamide (0.85 eq. acrylamide per eq. of amine groups in aminopolyamide)
 16 g 40% glyoxal solution.
There was obtained an amber colored liquid which gelled to an unusable state on standing overnight.

EXAMPLE V

Three runs were made with the following reagents, following the procedure and aminopolyamide of Example II.

|  | I | II | III |
|---|---|---|---|
| Aminopolyamide | 15 g. | 15 g. | 15 g. |
| Acrylamide | 7 g. | 10.5 g. | 7 g. |

-continued

| | I | II | III |
|---|---|---|---|
| 40% glyoxal solution | 24 g. | 16 g. | 12 g. |

All three products were obtained as clear, amber colored liquids. Sizing results were as follows:

| Product | g/Sq. Meter |
|---|---|
| I | 23 |
| II | 39 |
| III | 28 |

EXAMPLE VI

A dispersion of 23 g of a polymeric fat acid aminopolyamide and 7 g acrylamide was prepared by warming and stirring in 195 g of water. The aminopolyamide was prepared from an excess of triethylene tetramine providing a product having an amine number of about 240. It was held at 85° C. for 3 hours. Then, it was cooled to 50° C. and 16 g of 40 percent glyoxal solution was added. The pH of the mix was adjusted to about 7.5 with a few drops of 6 M hydrochloric acid and the temperature was held at 50° C. for one-half hour. Formic acid was added at this point to lower the pH to about 4.5. The sizing test result was 46 g/sq. meter.

EXAMPLE VII

A mixture of 90 g of a high imidazoline content polymeric fat acid aminopolyamide, 42 g acrylamide, and 528 g of water was stirred and heated for 2 hours at 85° C. The high imidazoline aminopolyamide was prepared from an excess of triethylene tetramine providing a product having an amine number about 390 and an imidazoline number of about 130 (as determined by infra red spectrum). Then 110 g was removed and pH of the mixture reduced to about 7.5 by adding dilute hydrochloric acid slowly, with stirring. Next 16 g of 40 percent glyoxal solution plus 16 g of water was added and the mixture held at 50° C. for 30 minutes followed by adding a few drops of formic acid to lower the pH to about 5. A clear, amber colored liquid was obtained. The sizing test result was 42.8 g/sq. meter.

EXAMPLE VIII

A resin was prepared from the following reactants:

| *polymeric fat acid | 150 | g. |
|---|---|---|
| tall oil fatty acid | 150 | g. |
| triethylene tetramine | 110.7 | g. |
| tetraethylene pentamine | 43.5 | g. |

*Polymerized tall oil fatty acids having a GLC anaylsis by weight of 8.8%M, 7.8%I, 70.3%D and 13.1%T.

The reactants were converted to an aminoamide resin through heating at 205° C. for 3 hours while removing by-product water by distillation. The product was a gummy substance with an amine number of 353.

This resin, 100 g., was dispersed in 680 g. water and 70 g. acrylamide added. It was stirred and held at 85°-90° C. for 3 hours, then cooled to 50° C. and the pH adjusted to 7.5 with hydrochloric acid while 100 g. of 40% glyoxal solution and 440 g. of water were added. It was held near 50° C. for 2 hours and then the pH was brought to 4.5 with a small amount of formic acid.

A 2 minute sizing test of the product just described, gave a value of 70.2 g/sq meter versus 32.8 g/sq. meter for a product made as described in Example I. In this sizing test a solution of 0.05% NV content was applied to a slacksized hand sheet of paper with a 7 mil blade and the paper then conditioned at 50% R.H. and 75° F. for 24 hours before testing.

EXAMPLE IX

A 3% solution of crystal violet dye in water was prepared. Then a 15% aqueous solution of resin was made up from the product prepared as in Example I. Finally, the dye solution and the resin solution were combined in various ratios by volume.

| Parts by volume Dye solution | Parts by volume Resin solution |
|---|---|
| 1 | 1 |
| 1 | 2 |
| 1 | 4 |
| 1 | 8 |
| 1 | 16 |

The product from each was found to be fully compatible. All were applied to water leaf paper by means of brush and flexographic hand proofer. Colors ranged from very deep violet to pale violet. All dried very quickly and the printed areas were thoroughly water resistant in a few seconds.

EXAMPLE X

In this example the sizing resin of Example I was added to wood pulp in the slurry stage before forming paper sheets and then compared with paper made in similar fashion but with only rosin-alum size agent added. The pulp used for the work was classed as 100% bleached hardwood Kraft. It was soaked in water overnight, then run through a vat with high speed agitation, followed by Valley beater and then agitated with 1% rosin solution and with 1% alum solution at a level of one-fourth percent rosin and 1% alum based on dry pulp content. The freeness was near a value of 200 CSF. Hand sheets were prepared from this pulp blend at 1% add-on level of sizing agent (dry basis). The sheets were conditioned overnight at 50% R.H. and 75° F. prior to applying a 2 minute Cobb sizing test. Results were as follows.

| % Agent added | Size Test (g/sq. meter) |
|---|---|
| 0 | 116.5 |
| 1.0 | 48.5 |

The embodiments of the present invention in which an exclusive property or privilege is claimed are defined as follows:

1. An aminopolyamide-acrylamide-glyoxal resin prepared by reacting
   a. a polymeric fat acid aminopolyamide having an amide number of about 150 to 600
   b. an amount of an unsaturated amide sufficient to react with substantially all the amine groups in the aminopolyamide, said unsaturated amide having the formula

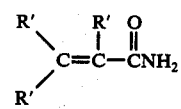

where R' is hydrogen or an alkyl group containing up to 6 carbon atoms and
  c. reacting the resulting aminopolyamideunsaturated amide adduct with about 0.3 to 1.5 moles of glyoxal per amide group present in said adduct.

2. A resin as defined in claim 1 wherein said aminopolyamide is the reaction product at a temperature in the range of about 100 to 300° C. of a polymeric fat acid and a polyamine of the formula $$H_2NR(NHR)_pNH_2$$

where R is an alkylene radical containing about 2 to 6 carbon atoms and p is a positive integer less than 6.

3. A resin as defined in claim 2 wherein said polymeric fat acid is a polymerized monocarboxylic aliphatic acid containing 16 to 20 carbon atoms.

4. A resin as defined in claim 2 wherein said polymerized fat acid is a polymerized $C_{18}$ monocarboxylic aliphatic acid.

5. A resin as defined in claim 2 wherein said polymeric fat acid is polymerized tall oil fatty acids.

6. A resin as defined in claim 1 wherein said unsaturated amide is acrylamide.

7. A process of preparing an aminopolyamide-acrylamide-polyaldehyde resin which comprises the steps of reacting
  a. a polymeric fat acid aminopolyamide having an amine number of about 150 to 600
  b. an amount of an unsaturated amide sufficient to react with substantially all the amine groups in the aminopolyamide, said unsaturated amide having the formula

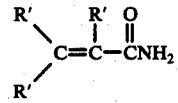

where R' is hydrogen or an alkyl group containing up to 6 carbon atoms and
  c. reacting the resulting aminopolyamideunsaturated amide adduct with about 0.3 to 1.5 moles of glyoxal per amide group present in said adduct.

8. A sized paper treated with about 0.03 to 5 percent by weight based on the weight of paper of the resin defined in claim 1.

* * * * *